United States Patent
Fujibayashi

[11] 4,235,519
[45] Nov. 25, 1980

[54] COMPACT RETROFOCUS TYPE WIDE ANGLE OBJECTIVE

[75] Inventor: Kazuo Fujibayashi, Yokohama, Japan

[73] Assignee: Canon Kabushiki Kaisha, Tokyo, Japan

[21] Appl. No.: 30,085

[22] Filed: Apr. 12, 1979

[30] Foreign Application Priority Data

Apr. 17, 1978 [JP] Japan .................. 53/45137

[51] Int. Cl.³ .................................. G02B 9/64
[52] U.S. Cl. ...................................... 350/214
[58] Field of Search .......................... 350/214

[56] References Cited
U.S. PATENT DOCUMENTS 3,507,559  4/1970  Mori .................... 350/214
3,982,823  9/1976  Momiyama et al. ........ 350/214

*Primary Examiner*—John K. Corbin
*Assistant Examiner*—Scott J. Sugarman
*Attorney, Agent, or Firm*—Toren, McGeady and Stanger

[57] ABSTRACT

The wide angle objective disclosed is composed of eight components. The first counting from the front is a negative meniscus lens of forward convexity. The second component is a positive lens with a front surface of strong positive power, and the third is a biconcave lens having a strong surface facing the rear. The fourth component is a positive lens with a front surface of strong positive power and the fifth is a doublet lens of positive power with its front surface convex toward the front and with its cemented surface of positive power convex toward the rear. The sixth component is a biconcave lens, the seventh is a positive doublet lens convex toward the rear and consisting of a negative lens element and a positive lens element cemented together at their adjoining surfaces, and the eighth is a positive lens with its rear surface being stronger in power than its front surface. In focusing the objective, as the entire lens system is axially moved as a whole relative to the image plane, the first and second components and moved as one fixed group and the third to eighth components as another fixed group are moved as another fixed group in differential relation to the first fixed group.

5 Claims, 16 Drawing Figures

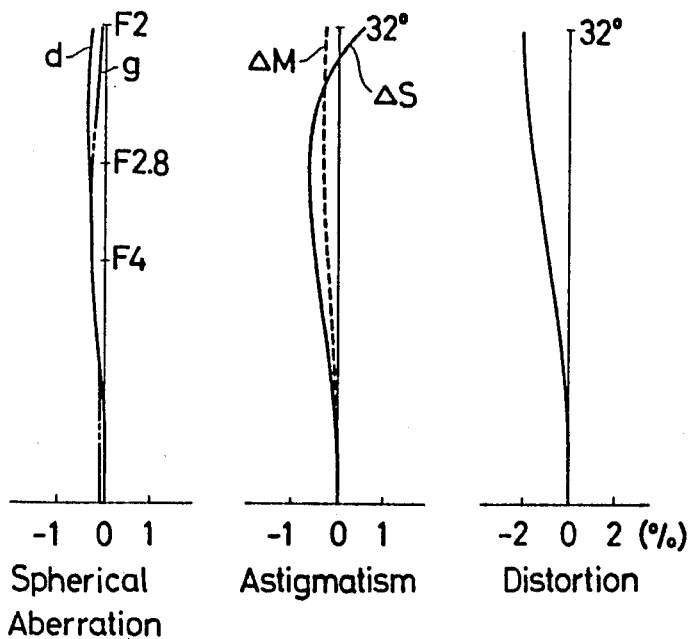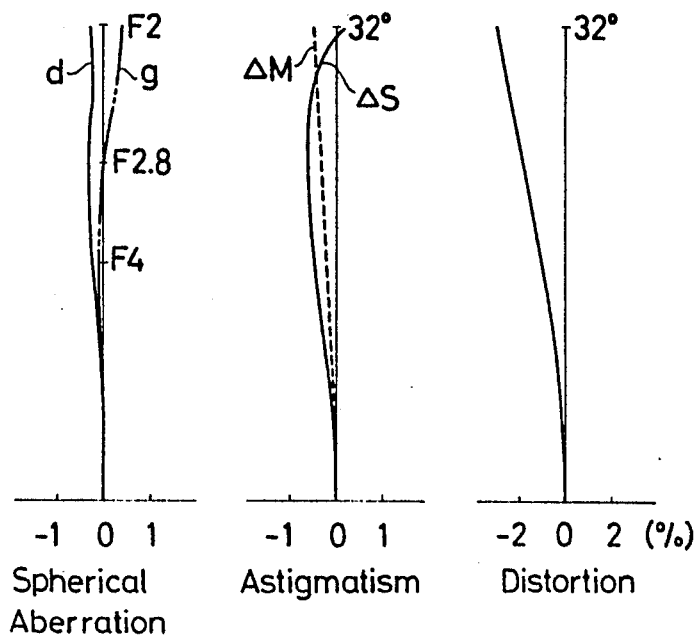

Image Magnification -.171, Image Height 61
Spherical Aberration / Astigmatism

Image Magnification -.171, Image Height 61
Spherical Aberration / Astigmatism

COMPACT RETROFOCUS TYPE WIDE ANGLE OBJECTIVE

BACKGROUND OF THE INVENTION

This invention relates to retrofocus type objectives of long back focal length suited for use in single lens reflex cameras, and more particularly to retrofocus type wide angle objectives of minimized bulk and size.

The retrofocus type objective, because of its intent of lengthening the back focal length, uses a negative lens of strong power at the front. This produces the drawback of increasing the distortion, coma, halo of sagittal rays, and other abberrations. To minimize the bulk and size of the objective as in the present invention, the negative power of the front component is required to be stronger than that of the ordinary retrofocus type objective. Thus, the various aberrations tend to increase further. Particularly with an objective of large relative aperture, the halo of sagittal rays becomes serious, and good correction of the aberrations becomes difficult.

A wide variaty of retrofocus type objectives have already been developed. Examples of an objective comprising a negative front group, a positive middle group, a diaphragm, and a positive rear group, the front group including negative, positive and negative lenses, and the rear group including negative, positive, positive lenses, are shown in U.S. Pat. No. 3,736,049 and No. 3,982,823.

SUMMARY OF THE INVENTION

A first object of the present invention is to provide a compact retrofocus type objective.

A second object is to provide for a retrofocus type objective with an increased relative aperture.

A third object is to achieve good correction of the various aberrations.

The retrofocus type objective according to the present invention comprises, from front to rear, a negative first lens in the meniscus form of forward convexity, a positive second lens whose front surface is of strong positive power, a biconcave third lens whose surface strong in power faces the rear, a positive fourth lens whose front surface is stronger in power than its rear surface, a positive fifth lens in doublet form with its frontmost surface convex toward the front and with its cemented surface of positive power convex toward the rear, a biconcave sixth lens, a positive seventh lens in meniscus doublet form convex toward the rear and consisting of a negative lens element and a positive lens element cemented together at their adjoining surfaces, and a positive eighth lens whose rear surface is stronger in power than its front surface, and is characterized by fulfilling the following conditions:

$$\frac{0.33}{f} < \left| \frac{N_5 - N_6}{r_{10}} \right| < \frac{0.42}{f} \quad (1)$$

$$1.4 < \left| \frac{f_{5-6}}{f_{7-11}} \right| < 1.82 \quad (2)$$

$$0.4 < \frac{r_7}{r_9} < 0.64 \quad (3)$$

$$0.75 < \frac{d_6}{d_{11}} < 0.95 \quad (4)$$

$$20 < v_9 - v_8 < 28 \quad (5)$$

$$-0.1/f < 1/f_{1-4} < 0.15/f \quad (6)$$

where
f: the focal length of the entire system;
$r_i$: the radius of curvature of the i-th surface;
$d_j$: the axial lens thickness or air separation between the j-th surface and the (j+1)th surface;
$N_k$: the index of refraction for the k-th lens element;
$v_l$: the Abbe number for the l-th lens element; and
$f_{m-n}$: the overall focal length of the m-th to n-th surfaces.

These conditions have now been found to be effective for realization of a high performance retrofocus type photographic lens system having a back focal length of at least 1.02f and as large a relative aperture as F2 with the limitation of the bulk and size to 2.47f in the physical length and 0.9f in the diameter of the front lens member.

BRIEF DESCRIPTION OF THE DRAWINGS

FIGS. 5A to 5C are similar graphs for the objective of FIG. 2.

FIGS. 6A to 6C are similar graphs for the objective of FIG. 3.

DESCRIPTION OF THE PREFERRED EMBODIMENTS

Figure 1:
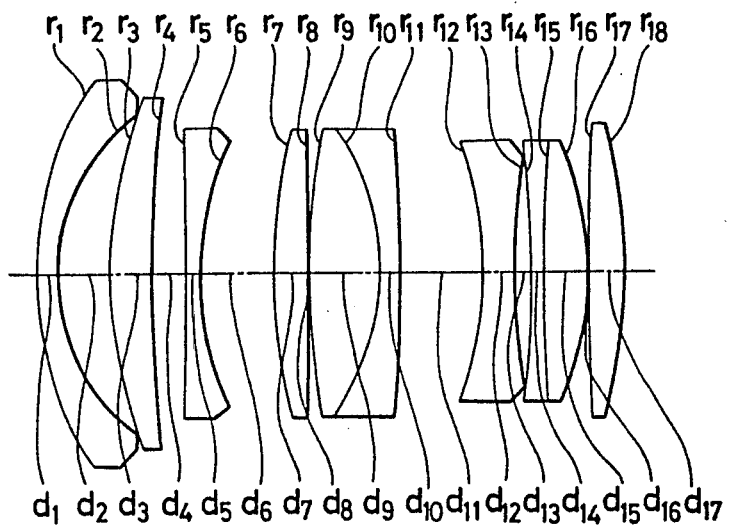
FIG. 1 is a sectional view of one embodiment of a retrofocus type objective according to the present invention.
Figure 2:
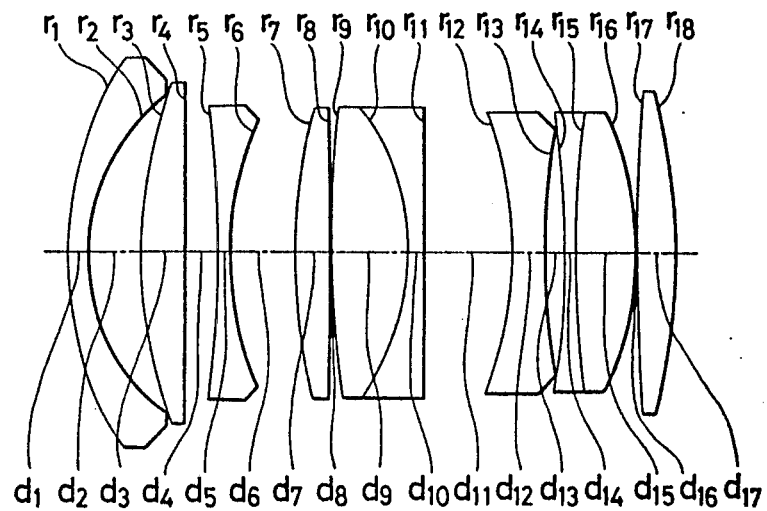
FIG. 2 is a similar view showing another embodiment of the invention.
Figure 3:
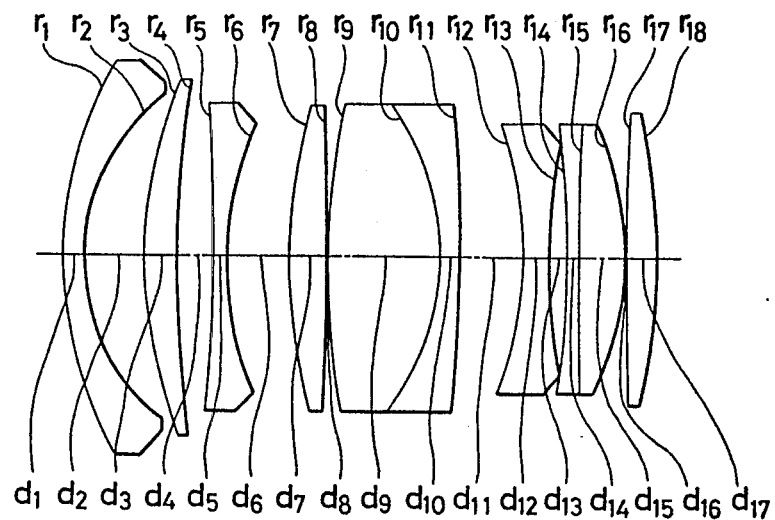
FIG. 3 is a similar view showing still another embodiment of the invention.
Figures 4A, 4B, 4C:
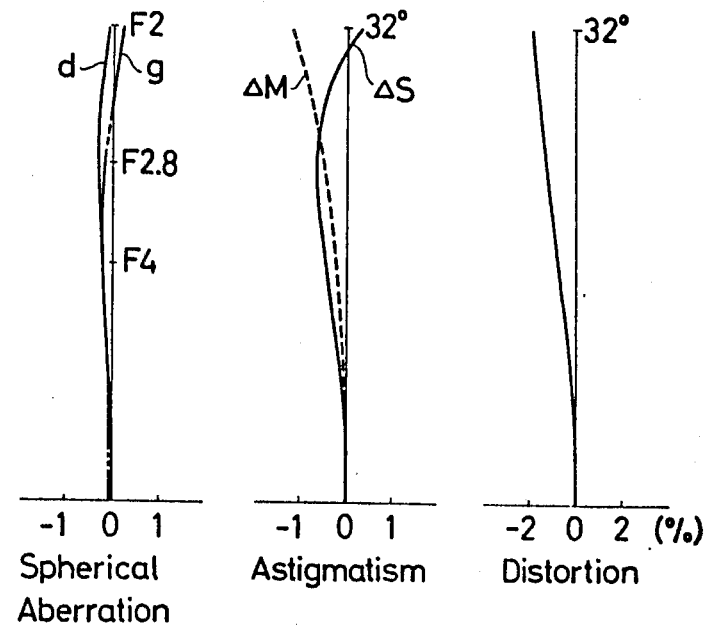
FIGS. 4A to 4C are graphs showing the spherical aberration, astigmatism and distortion of the objective of FIG. 1 respectively, when focused at infinity.

The embodiments of the objectives represented in FIGS. 1 to 3 individually satisfy the above-defined conditions, each of which is explained below in detail.

In designing a wide angle objective for use in a single lens reflex camera, the shorter the total optical length of the objective, the stronger must be the negative power of the front part and the positive power of the rear part in order to assure the necessary back focal length. This intensifies the degree of curvature of the spherical aberration curve. Since the central bundle of light rays expands most widely in a space which the fifth lens component is intended to occupy, the curvature of the spherical aberration curve can be flattened to an acceptable degree by constructing the fifth component in the cemented form to satisfy condition (1). As the positive lens element is made from a glass material having a high index of refraction and the negative lens element from a glass material having a low index of refraction, this cemented lens contributes to correction of field curvature. In order to effect production of as little coma as possible, it is preferable to position the cemented surface adjacent the diaphragm. When the upper limit of condition (1) is exceeded, an unacceptable coma will be produced and deteriorate the image quality. When the lower limit is exceeded, the spherical aberration will be under-corrected, and the curvature of image field will also become large.

From a reason to be described later, since the composite system of the first and second components is almost afocal, a large proportion of the negative power of the front part in the retrofocus type lens system must be concentrated only in the third component. This in turn causes the third component to produce very large distortion, coma and halo of sagittal rays. Particularly at the large relative aperture of F2, the halo of sagittal rays is very pronounced. In general it is advantageous to compensate for the halo of sagittal rays by those of the components at which the bundle size of sagittal rays is most widely expanded. To allow for this, conditions (2), (3) and (4) are set forth.

Condition (2) is a compromise between the requirements of lengthening the back focal length and shortening the total optical length and of well compensating for the halo of sagittal rays. In the latter connection, the powers of the fourth and fifth components must be strengthened to a moderate degree. When the lower limit of condition (2) is exceeded, though the back focal length becomes longer, the third component introduces too large a halo of sagittal rays to be properly corrected for by the fourth and fifth components. When the upper limit of condition (2) is exceeded, the assurance for the necessary back focal length becomes difficult, and very large coma and field curvature are produced.

Even if condition (2) is satisfied, an unbalanced power distribution over the fourth and fifth components will lead to the production of very large spherical aberration and coma. On this account, an optimum power distribution is set forth in condition (3) within a framework in which both components are positive lenses with their front surfaces convex toward the front and stronger in curvature than their rear surfaces. Under condition (3) the halo of sagittal rays can be effectively compensated for, while simultaneously suppressing the production of the other aberrations. When the upper limit of condition (3) is exceeded, the halo of sagittal rays will be insufficiently compensated for, and the spherical aberration will also be under-corrected. When the lower limit of condition (3) is exceeded, very large astigmatism and coma will be produced.

In effectively compensating for the halo of saggital rays, the arrangement of the fourth and fifth components is also important. When they are positioned in an air space between the third and sixth components at almost the center of the axial separation thereof, a good aberrational correction can be performed. This is condition (4). When the upper limit of condition (4) is exceeded, the diameter of an effective light bundle at the fourth and fifth components will become so large that very large spherical aberration is produced. The entire length is also increased so that one of the objects of the invention cannot be achieved. When the lower limit of condition (4) is exceeded, the axial separation between the third and fourth components will become so narrow that not only good correction of the halo of sagittal rays is difficult to perform. However, the back focal length is not lengthened.

Thus, the halo of sagittal rays introduced by the preceding components has been cancelled out by the suitable design of the fourth and fifth components.

The lateral chromatic aberration introduced by the preceding components is, however, not yet compensated for yet. Then, seventh component is constructed in the cemented form consisting of negative and positive lens elements for which the dispersive indices are controlled to differ greatly from each other in accordance with condition (5). When the upper limit of condition (5) is exceeded, over-correction of lateral chromatic aberration will result. When the lower limit of condition (5) is exceeded, it will be difficult to perform good correction.

On account of the large relative aperture, the front part tends to produce large aberrations. To avoid this, it is very effective for the first and second components to form a system nearly afocal. With the first component of negative power and the second component of positive power, such system assists in lengthening the back focal length while nevertheless permitting little distortion, astigmatism and coma be produced to. Then, condition (6) is set forth. When the upper limit of condition (6) is exceeded, it will become impossible to assure the sufficiently long back focal length. When the lower limit is exceeded, the back focal length can be advantageously lengthened, but very large distortion is produced.

Figures 7A, 7B:
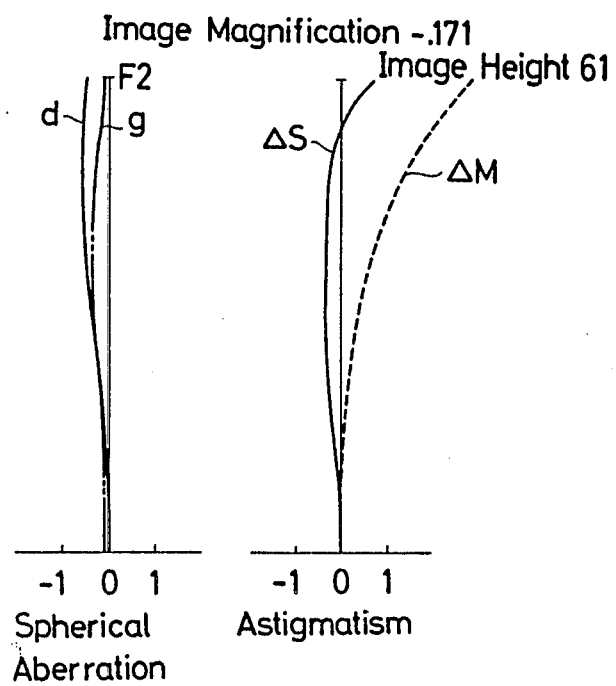
FIGS. 7A and 7B are graphs showing the spherical aberration and astigmatism of the objective of FIG. 1 when focused down to shorter object distances without variation of the lens separation between the first and second lens groups.
Figures 8A, 8B:
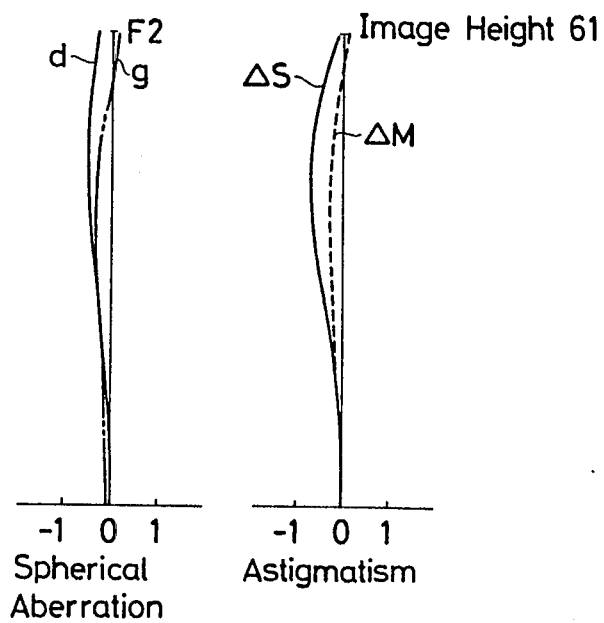
FIGS. 8A and 8B are similar graphs for the objective of FIG. 1 when the lens separation is varied during focusing.

Retrofocus type objectives generally exhibit the drawback that when they are focused upon shorter object distances, the astigmatic difference is greatly increased. It is particularly true that where the relative aperture is large, as the depth of focus is narrow, substantial deterioration of the image quality will be noted. To preserve high grade imaging performance even for objects at shorter distances, according to the present invention, whilst the entire system is axially moved forwards, the axial separation between the first group and the second group is narrowed, where the first group is composed of the first and second components and the second group is composed of the third to eighth component. Since the light bundle in this variable separation, namely, $d_4$ is made almost afocal based on the condition (6), the focal length of the entire system remains almost unchanged throughout the focusing range, and the variation with focusing of coma is limited to a minimum. How such focusing provision affects the imagery can be seen by comparison of FIGS. 7A-7B with FIGS. 8A-8B, where the object distance corresponds to an image magnification of $-0.171$, and the axial separation $d_4$ for that shorter object distance is different from that for object at infinity by 1.53.

The three specific objective lens systems can be constructed in accordance with the numerical data given below for the radii of curvature, r, of the lens surfaces, the axial lens thicknesses or air separations, d, along with the indices of refraction, Nd, for the spectral d line of sodium and the Abbe numbers, $\nu d$, for the spectral d line of sodium, for the various lens elements. The character f denotes the focal length of the entire system, b.f. the back focal length, L the total optical length and D the diameter of the front member.

EXAMPLE 1

| Surface No. | F-number = 1:2 | | Image Angle 2ω = 64° | |
|---|---|---|---|---|
| | r | d | Nd | νd |
| 1 | 80.127 | 5.07 | 1.60729 | 59.40 |
| 2 | 45.992 | 12.54 | 1 | |
| 3 | 97.715 | 10.21 | 1.72000 | 50.20 |
| 4 | 369.750 | 7.62 | 1 | |
| 5 | −856.450 | 3.38 | 1.54869 | 45.60 |
| 6 | 71.127 | 17.65 | 1 | |
| 7 | 132.110 | 7.72 | 1.77250 | 49.60 |
| 8 | 9675.600 | 0.56 | 1 | |
| 9 | 219.290 | 16.88 | 1.80610 | 40.90 |
| 10 | −56.941 | 4.44 | 1.59551 | 39.20 |
| 11 | −608.610 | 19.38 | 1 | |
| 12 | −88.811 | 7.80 | 1.72825 | 28.50 |
| 13 | 151.610 | 4.20 | 1 | |
| 14 | −236.920 | 2.82 | 1.80518 | 25.40 |

-continued

| Surface No. | F-number = 1:2 | | Image Angle 2ω = 64° | |
|---|---|---|---|---|
| | r | d | Nd | νd |
| 15 | 524.560 | 10.42 | 1.77250 | 49.60 |
| 16 | −72.310 | 0.56 | 1 | |
| 17 | 1536.100 | 7.76 | 1.77250 | 49.60 |
| 18 | −130.130 | | 1 | |

$f = 100.0$, b.f. = 102.74, $L = 241.75$, $D = 83.8$,
$|(N_5-N_6)/r_{10}| = 0.00370$
$d_6/d_{11} = 0.910$
$|f_{5\sim6}/f_{7\sim11}| = 1.61$
$v_9 - v_8 = 24.2$
$r_7/r_9 = 0.603$
$1/f_{1\sim4} = +0.00037$

| Surface No. | 3rd-Order Aberration Coefficients | | | | |
|---|---|---|---|---|---|
| | SA | CM | AS | PT | DS |
| 1 | 0.4567 | 0.0761 | 0.0126 | 0.4714 | 0.0807 |
| 2 | −5.6619 | 1.2240 | −0.2646 | −0.8214 | 0.2347 |
| 3 | 1.6266 | 0.1970 | 0.0238 | 0.4283 | 0.0547 |
| 4 | −0.0025 | −0.0093 | −0.0336 | −0.1131 | −0.5297 |
| 5 | −0.0012 | 0.0081 | −0.0533 | −0.0413 | 0.6219 |
| 6 | −4.2497 | −0.4236 | −0.0422 | −0.4980 | −0.0538 |
| 7 | 2.6515 | 0.8386 | 0.2652 | 0.3298 | 0.1882 |
| 8 | −0.0029 | −0.0155 | −0.0817 | −0.0045 | −0.4528 |
| 9 | 0.1278 | 0.1401 | 0.1536 | 0.2035 | 0.3915 |
| 10 | 3.4282 | −1.0284 | 0.3085 | 0.1283 | −0.1310 |
| 11 | 0.6277 | −0.5858 | 0.5467 | 0.0613 | −0.5674 |
| 12 | −2.9116 | 1.2181 | −0.5096 | −0.4744 | 0.4117 |
| 13 | −0.5043 | −0.5661 | −0.6355 | −0.2778 | −1.0254 |
| 14 | 0.0000 | 0.0042 | 0.2046 | −0.1882 | 0.7982 |
| 15 | −0.0135 | −0.0151 | −0.0169 | −0.0019 | −0.0211 |
| 16 | 1.9528 | −0.4948 | 0.1254 | 0.6026 | −0.1844 |
| 17 | −0.0162 | 0.0528 | −0.1725 | 0.0283 | 0.4707 |
| 18 | 2.8818 | −0.6221 | 0.1343 | 0.3348 | −0.1012 |
| Total | 0.3893 | −0.0017 | −0.0351 | 0.1676 | 0.1852 |

SA : Spherical Aberration
CM : Coma
AS : Astigmatism
PT : Petzval Sum
DS : Distortion

EXAMPLE 2

| Surface No. | F-number = 1:2 | | Image Angle 2ω = 64° | |
|---|---|---|---|---|
| | r | d | Nd | νd |
| 1 | 82.079 | 5.07 | 1.60311 | 60.70 |
| 2 | 45.851 | 12.64 | 1 | |
| 3 | 107.720 | 9.92 | 1.69700 | 48.50 |
| 4 | −4830.700 | 6.69 | 1 | |
| 5 | −317.040 | 3.38 | 1.54869 | 45.60 |
| 6 | 77.090 | 15.41 | 1 | |
| 7 | 138.440 | 7.67 | 1.77250 | 49.60 |
| 8 | −990.830 | 0.56 | 1 | |
| 9 | 330.460 | 17.67 | 1.80610 | 40.90 |
| 10 | −54.417 | 4.45 | 1.58144 | 40.70 |
| 11 | −1629.900 | 20.42 | 1 | |
| 12 | −91.389 | 8.48 | 1.75520 | 27.50 |
| 13 | 175.110 | 3.89 | 1 | |
| 14 | −217.940 | 2.82 | 1.75520 | 27.50 |
| 15 | 248.680 | 13.84 | 1.75700 | 47.90 |
| 16 | −73.184 | 0.56 | 1 | |
| 17 | 529.010 | 9.03 | 1.77250 | 49.60 |
| 18 | −144.071 | | 1 | |

$f = 100.0$, b.f. = 102.81, $L = 245.31$,
$D = 83.9$
$|(N_5-N_6)/r_{10}| = 0.00413$
$d_6/d_{11} = 0.755$
$|f_{5\sim6}/f_{7\sim11}| = 1.43$
$v_9 - v_8 = 20.4$
$r_7/r_9 = 0.419$
$f_{1\sim4} = +0.00142$

| Surface No. | 3rd-Order Aberration Coefficients | | | | |
|---|---|---|---|---|---|
| | SA | CM | AS | PT | DS |
| 1 | 0.4243 | 0.0863 | 0.0175 | 0.4583 | 0.0968 |
| 2 | −5.8650 | 1.1904 | −0.2416 | −0.8204 | 0.2155 |
| 3 | 1.4384 | 0.2402 | 0.0401 | 0.3812 | 0.0703 |
| 4 | 0.0027 | −0.0171 | 0.1077 | 0.0085 | −0.7316 |
| 5 | −0.0352 | 0.0854 | −0.2073 | −0.1117 | 0.7742 |
| 6 | −3.4449 | −0.4708 | −0.0643 | −0.4595 | −0.0716 |
| 7 | 2.1398 | 0.7495 | 0.2625 | 0.3147 | 0.2022 |
| 8 | 0.0000 | −0.0001 | 0.0021 | 0.0439 | −0.5198 |
| 9 | 0.0196 | 0.0407 | 0.0845 | 0.1350 | 0.4560 |
| 10 | 3.7790 | −1.1475 | 0.3484 | 0.1445 | −0.1497 |
| 11 | 0.3459 | −0.4015 | 0.4661 | 0.0225 | −0.5673 |
| 12 | −2.3610 | 1.0598 | −0.4757 | −0.4707 | 0.4248 |
| 13 | −0.4272 | −0.5224 | −0.6389 | −0.2457 | −1.0819 |
| 14 | 0.0000 | 0.0014 | 0.2029 | −0.1974 | 0.7998 |
| 15 | 0.0016 | 0.0015 | 0.0014 | 0.0002 | 0.0015 |
| 16 | 1.7472 | −0.4013 | 0.0921 | 0.5886 | −0.1563 |
| 17 | −0.0014 | 0.0142 | −0.1356 | 0.0823 | 0.5076 |
| 18 | 2.5878 | −0.5100 | 0.1005 | 0.3024 | −0.0794 |
| Total | 0.3516 | −0.0013 | −0.0373 | 0.1771 | 0.1914 |

EXAMPLE 3

| Surface No. | F-number = 1:2 | | Image Angle 2ω = 64° | |
|---|---|---|---|---|
| | r | d | Nd | νd |
| 1 | 84.454 | 5.07 | 1.60129 | 59.40 |
| 2 | 46.676 | 13.86 | 1 | |
| 3 | 103.080 | 7.73 | 1.72000 | 50.20 |
| 4 | 276.420 | 8.68 | 1 | |
| 5 | −446.020 | 3.38 | 1.53172 | 48.90 |
| 6 | 79.609 | 14.68 | 1 | |
| 7 | 130.890 | 8.89 | 1.77250 | 49.60 |
| 8 | −809.300 | 0.56 | 1 | |
| 9 | 211.680 | 25.94 | 1.80610 | 40.90 |
| 10 | −57.195 | 4.45 | 1.61657 | 36.60 |
| 11 | −486.000 | 15.77 | 1 | |
| 12 | −87.415 | 6.58 | 1.71736 | 29.50 |
| 13 | 145.620 | 4.65 | 1 | |
| 14 | −227.460 | 2.82 | 1.80518 | 25.40 |
| 15 | 823.080 | 10.56 | 1.75500 | 52.30 |
| 16 | −70.518 | 0.56 | 1 | |
| 17 | 1034.700 | 7.22 | 1.77250 | 49.60 |
| 18 | −145.000 | | 1 | |

$f = 100.0$, b.f. = 105.02, $L = 246.42$
$D = 86.1$
$|(N_5-N_6)/r_{10}| = 0.00331$
$d_6/d_{11} = 0.931$
$|f_{5\sim6}/f_{7\sim11}| = 1.8$
$v_9 - v_8 = 26.9$
$r_7/r_9 = 0.618$
$1/f_{1\sim4} = −0.00089$

| Surface No. | 3rd-Order Aberration Coefficients | | | | |
|---|---|---|---|---|---|
| | SA | CM | AS | PT | DS |
| 1 | 0.3901 | 0.0783 | 0.0157 | 0.4473 | 0.0930 |
| 2 | −5.6846 | 1.2779 | −0.2872 | −0.8094 | 0.2465 |
| 3 | 1.6059 | 0.2017 | 0.0253 | 0.4060 | 0.0542 |
| 4 | −0.0343 | −0.0554 | −0.0893 | −0.1514 | −0.3880 |
| 5 | 0.0000 | 0.0004 | −0.0027 | −0.0778 | 0.5477 |
| 6 | −4.4429 | −0.3668 | −0.0302 | −0.4360 | −0.0385 |
| 7 | 3.4135 | 0.8059 | 0.1902 | 0.3329 | 0.1235 |
| 8 | 0.0000 | 0.0015 | −0.0278 | 0.0538 | −0.4648 |
| 9 | 0.1145 | 0.1207 | 0.1274 | 0.2108 | 0.3568 |
| 10 | 3.1980 | −0.9462 | 0.2799 | 0.1134 | −0.1164 |
| 11 | 0.8466 | −0.7187 | 0.6100 | 0.0784 | −0.5844 |
| 12 | −3.4863 | 1.4509 | −0.6038 | −0.4778 | 0.4501 |
| 13 | −0.5338 | −0.5534 | −0.5737 | −0.2868 | −0.8921 |
| 14 | 0.0001 | −0.0042 | 0.1786 | −0.1960 | 0.7355 |
| 15 | −0.0163 | −0.0189 | −0.0218 | −0.0019 | −0.0275 |
| 16 | 2.3245 | −0.6044 | 0.1571 | 0.6099 | −0.1994 |
| 17 | −0.0156 | 0.0530 | −0.1798 | 0.0421 | 0.4673 |
| 18 | 2.6848 | −0.7344 | 0.2009 | 0.3005 | −0.1371 |

-continued

| Surface No. | 3rd-Order Aberration Coefficients | | | | |
|---|---|---|---|---|---|
| | SA | CM | AS | PT | DS |
| Total | 0.3640 | −0.0121 | −0.0311 | 0.1583 | 0.2261 |

What is claimed is:

1. A compact retrofocus type wide angle objective lens system comprising: from front to rear, a negative meniscus first lens convex toward the front, a positive second lens with its front surface having a strong positive power, a bi-concave third lens with its strong power surface facing the rear, a positive fourth lens with its front surface having a strong positive power, a positive cemented fifth lens with its cemented surface being convex toward the rear and having a positive power, and with its first surface being convex toward the front, a bi-concave sixth lens, a positive meniscus cemented seventh lens convex toward the rear, and a positive eighth lens with its strong power surface being faced toward the rear, and satisfying the following relationships:

$$\frac{0.33}{f} < \left| \frac{N_5 - N_6}{r_{10}} \right| < \frac{0.42}{f} \quad (1)$$

$$1.4 < \left| \frac{f_{5-6}}{f_{7-11}} \right| < 1.82 \quad (2)$$

$$0.4 < \frac{r_7}{r_9} < 0.64 \quad (3)$$

$$0.75 < \frac{d_6}{d_{11}} < 0.95 \quad (4)$$

$$20 < \nu_9 - \nu_8 < 28 \quad (5)$$

$$-0.1/f < 1/f_{1-4} < 0.15/f \quad (6)$$

where f is the focal length of the entire system; $r_i$ is the radius of curvature of the i-th surface; $d_j$ is the j-th axial lens thickness or air separation; $N_k$ is the index of refraction of a material from which the k-th lens element is made; $\nu_l$ is the Abbe number of a material from which the l-th lens element is made; and $f_{m-n}$ is the overall focal length of the m-th to n-th surfaces.

2. An objective lens system as described in claim 1, wherein said first and said second lenses are combined in fixed spatial relation as a group I, and said third to said eighth lenses are combined in fixed spatial relation as a group II, and wherein during focusing, whilst the entire system is axially moved relative to the film plane, said two groups I and II are axially moved in differential relation to each other.

3. An objective lens system as described in claim 1, and wherein said system has the following numerical data as related to a focal length of 100.

| Surface No. | F-number = 1:2 | | Image Angle 2ω = 64° | |
|---|---|---|---|---|
| | r | d | Nd | νd |
| 1 | 80.127 | 5.07 | 1.60729 | 59.40 |
| 2 | 45.992 | 12.54 | 1 | |
| 3 | 97.715 | 10.21 | 1.72000 | 50.20 |
| 4 | 369.750 | 7.62 | 1 | |
| 5 | −856.450 | 3.38 | 1.54869 | 45.60 |
| 6 | 71.127 | 17.65 | 1 | |
| 7 | 132.110 | 7.72 | 1.77250 | 49.60 |
| 8 | 9675.600 | 0.56 | 1 | |
| 9 | 219.290 | 16.88 | 1.80610 | 40.90 |
| 10 | −56.941 | 4.44 | 1.59551 | 39.20 |
| 11 | −608.610 | 19.38 | 1 | |
| 12 | −88.811 | 7.80 | 1.72825 | 28.50 |
| 13 | 151.610 | 4.20 | 1 | |
| 14 | −236.920 | 2.82 | 1.80518 | 25.40 |
| 15 | 524.560 | 10.42 | 1.77250 | 49.60 |
| 16 | −72.310 | 0.56 | 1 | |
| 17 | 1536.100 | 7.76 | 1.77250 | 49.60 |
| 18 | −130.130 | | 1 | |

4. An objective lens system as described in claim 1, and wherein said system has the following numerical data as related to a focal length of 100.

| Surface No. | F-number = 1:2 | | Image Angle 2ω = 64° | |
|---|---|---|---|---|
| | r | d | Nd | νd |
| 1 | 82.079 | 5.07 | 1.60311 | 60.70 |
| 2 | 45.851 | 12.64 | 1 | |
| 3 | 107.720 | 9.92 | 1.69700 | 48.50 |
| 4 | −4830.700 | 6.69 | 1 | |
| 5 | −317.040 | 3.38 | 1.54869 | 45.60 |
| 6 | 77.090 | 15.41 | 1 | |
| 7 | 138.440 | 7.67 | 1.77250 | 49.60 |
| 8 | −990.830 | 0.56 | 1 | |
| 9 | 330.460 | 17.67 | 1.80610 | 40.90 |
| 10 | −54.417 | 4.45 | 1.58144 | 40.70 |
| 11 | −1629.900 | 20.42 | 1 | |
| 12 | −91.389 | 8.48 | 1.75520 | 27.50 |
| 13 | 175.110 | 3.89 | 1 | |
| 14 | −217.940 | 2.82 | 1.75520 | 27.50 |
| 15 | 248.680 | 13.84 | 1.75700 | 47.90 |
| 16 | −73.184 | 0.56 | 1 | |
| 17 | 529.010 | 9.03 | 1.77250 | 49.60 |
| 18 | −144.071 | | 1 | |

5. An objective lens system as described in claim 1, and wherein said system has the following numerical data as related to a focal length of 100.

| Surface No. | f-number 1:2 | | Image Angle 2ω = 64° | |
|---|---|---|---|---|
| | r | d | Nd | νd |
| 1 | 84.454 | 5.07 | 1.60129 | 59.40 |
| 2 | 46.676 | 13.86 | 1 | |
| 3 | 103.080 | 7.73 | 1.72000 | 50.20 |
| 4 | 276.420 | 8.68 | 1 | |
| 5 | −446.020 | 3.38 | 1.53172 | 48.90 |
| 6 | 79.609 | 14.68 | 1 | |
| 7 | 130.890 | 8.89 | 1.77250 | 49.60 |
| 8 | −809.300 | 0.56 | 1 | |
| 9 | 211.680 | 25.94 | 1.80610 | 40.90 |
| 10 | −57.195 | 4.45 | 1.61659 | 36.60 |
| 11 | −486.000 | 15.77 | 1 | |
| 12 | −87.415 | 6.58 | 1.71736 | 29.50 |
| 13 | 145.620 | 4.65 | 1 | |
| 14 | −227.460 | 2.82 | 1.80518 | 25.40 |
| 15 | 823.080 | 10.56 | 1.75500 | 52.30 |
| 16 | −70.518 | 0.56 | 1 | |
| 17 | 1034.700 | 7.22 | 1.77250 | 49.60 |
| 18 | −145.000 | | 1 | |

* * * * *